(12) United States Patent
Endres

(10) Patent No.: US 9,580,188 B2
(45) Date of Patent: Feb. 28, 2017

(54) AIRPORT CAPACITY FROM TAKEOFF ASSIST

(71) Applicant: Exhaustless, Inc., Ann Arbor, MI (US)

(72) Inventor: Steven P. Endres, Ann Arbor, MI (US)

(73) Assignee: Exhaustless, Inc., Ann Arbor, MI (US)

( * ) Notice: Subject to any disclaimer, the term of this patent is extended or adjusted under 35 U.S.C. 154(b) by 0 days.

(21) Appl. No.: 14/855,712

(22) Filed: Sep. 16, 2015

(65) Prior Publication Data

US 2016/0039535 A1    Feb. 11, 2016

Related U.S. Application Data

(63) Continuation of application No. 13/747,323, filed on Jan. 22, 2013, now Pat. No. 9,156,564.

(51) Int. Cl.
| | |
|---|---|
| *B64C 25/50* | (2006.01) |
| *B64F 1/04* | (2006.01) |
| *B64F 1/00* | (2006.01) |
| *B64F 1/06* | (2006.01) |
| *B64F 1/10* | (2006.01) |

(52) U.S. Cl.
CPC ............. *B64F 1/04* (2013.01); *B64F 1/002* (2013.01); *B64F 1/06* (2013.01); *B64F 1/10* (2013.01)

(58) Field of Classification Search
CPC .. B64F 1/002; B64F 1/04; B64F 1/228; B64F 1/224; B64F 1/225; B64F 1/22; B64F 1/08; B64F 1/06
See application file for complete search history.

(56) References Cited

U.S. PATENT DOCUMENTS

| | | | |
|---|---|---|---|
| 2,197,300 A | 4/1940 | Fleet et al. | |
| 2,404,984 A | 7/1946 | Powers | |
| 2,519,253 A | 8/1950 | Jones | |
| 2,845,237 A | 7/1958 | Doolittle et al. | |
| 3,211,425 A * | 10/1965 | Greulich ................... | B64F 1/22 254/2 R |
| 3,380,690 A | 4/1968 | Rego | |
| 3,428,273 A | 2/1969 | Tyler | |
| 3,516,626 A | 6/1970 | Strance et al. | |
| 3,612,484 A * | 10/1971 | Gallagher ............. | B64F 5/0036 254/2 R |
| 3,977,631 A | 8/1976 | Jenny | |

(Continued)

FOREIGN PATENT DOCUMENTS

| | | | |
|---|---|---|---|
| GB | 512197 A * | 8/1939 | ............... B64F 1/22 |
| WO | 2004087459 A1 | 10/2004 | |

OTHER PUBLICATIONS

International Search Report and Written Opinion mailed Jul. 10, 2014, for International Application No. PCT/US14/12608 filed Jan. 22, 2014.

(Continued)

*Primary Examiner* — Philip J Bonzell
(74) *Attorney, Agent, or Firm* — Perkins Coie LLP

(57) ABSTRACT

Systems and methods for ground-based aircraft thrust systems are provided. A sled can be adapted to support at least wings and a fuselage of an aircraft. A guideway can be configured to receive the sled and move the sled along the guideway for assisted takeoff of the aircraft. A magnetic propulsion system can be configured to levitate the sled and propel the sled along the guideway independent of thrust provided by the aircraft.

12 Claims, 15 Drawing Sheets

(56) References Cited

U.S. PATENT DOCUMENTS

| | | | |
|---|---|---|---|
| 4,079,901 | A | 3/1978 | Mayhew et al. |
| 4,223,856 | A | 9/1980 | DiVincenzo |
| 4,709,883 | A | 12/1987 | Giuliani et al. |
| 4,842,086 | A | 6/1989 | Michna |
| 4,941,406 | A | 7/1990 | Lay |
| 5,388,527 | A | 2/1995 | Thornton |
| 5,626,310 | A | 5/1997 | Kelly |
| 5,950,543 | A | 9/1999 | Oster |
| 6,029,928 | A | 2/2000 | Kelly |
| 6,131,854 | A | 10/2000 | Nicolai |
| 6,357,359 | B1 | 3/2002 | Davey et al. |
| 6,457,673 | B1 | 10/2002 | Miller |
| 6,851,647 | B1 | 2/2005 | Rosenbaum et al. |
| 7,090,166 | B2 | 8/2006 | Dennis et al. |
| 7,104,495 | B2 | 9/2006 | McGeer |
| 7,114,680 | B2 | 10/2006 | Dennis |
| 7,128,294 | B2 | 10/2006 | Roeseler et al. |
| 7,143,974 | B2 | 12/2006 | Roeseler et al. |
| 7,165,745 | B2 | 1/2007 | McGeer et al. |
| 7,232,092 | B2 | 6/2007 | Yamamoto |
| 7,445,178 | B2 | 11/2008 | McCoskey et al. |
| 7,594,624 | B2 | 9/2009 | Yamamoto |
| 8,028,953 | B2 | 10/2011 | Hosaka et al. |
| 9,079,671 | B2 | 7/2015 | Endres |
| 2003/0053278 | A1 | 3/2003 | Belisle |
| 2010/0028123 | A1 | 2/2010 | McCrary et al. |
| 2010/0127579 | A1 | 5/2010 | Bojiuc |
| 2010/0269729 | A1 | 10/2010 | Loeser et al. |
| 2014/0203136 | A1 | 7/2014 | Endres |
| 2014/0203137 | A1 | 7/2014 | Endres |

OTHER PUBLICATIONS

International Search Report and Written Opinion mailed Nov. 6, 2014, for International Application No. PCT/US2014/012603 filed Jan. 22, 2014.

Non-Final Office Action mailed Jan. 16, 2015 for U.S. Appl. No. 13/747,323, filed Jan. 22, 2013.

Non-Final Office Action mailed Jan. 23, 2015 for U.S. Appl. No. 13/747,333, filed Jan. 22, 2013.

Notice of Allowance mailed Apr. 20, 2015 for U.S. Appl. No. 13/747,333, filed Jan. 22, 2013.

Notice of Allowance mailed Jul. 17, 2015, for U.S. Appl. No. 13/747,323, filed Jan. 22, 2013.

U.S. Appl. No. 13/747,323 of Endres, S.P. et al., filed Jan. 22, 2013.

U.S. Appl. No. 13/747,333 of Endres, S.P. et al., filed Jan. 22, 2013.

"Aircraft catapult", Retrieved from http://en.wikipedia.org/wiki/Aircraft_catapult on Feb. 7, 2013, 4 pages.

"Aircraft Recovery Bulletin 'Gotchas'", Paddles monthly, Dec. 2010, pp. 1-7, Virginia Beach, VA.

"Chapter 1: Background What is Maglev?", National Maglev Initiative, downloaded on Jan. 25, 2013 from http://inventors.about.com/library/inventors/blrailroad3.htm.

"Introduction to Maglev Monorail", The Monorail Society Website Technical Pages, downloaded on Jan. 25, 2013 from http://www.monorails.org/tmspages/TPMagIntro.html.

"Navy Has World's Fastest Trolley to Revolutionize Plane Launching", The Pittsburgh Press, Sep. 1, 1946, 2 pages, Pittsburgh, PA.

"US Navy demonstrates the 'Electropult'", downloaded from http://www.itnsource.com/en/shotlist/BHC_RTV/1946/10/24/BGU410140041/?v=2 on Feb. 7, 2013, video originally released on Oct. 24, 1946, 2 pages, Issue 1336, Reuters.

"Westinghouse Announces Air Launching Device", Pittsburgh Post-Gazette, Sep. 2, 1946, 1 page, Pittsburgh, PA.

Bhamidi, Sarveswara Prasad, Design of a Single Sided Linear Induction Motor (SLIM) Using a User Interactive Computer Program, May 2005, 108 pages, University of Missouri-Columbia.

Dodson, Brian, "New York to Beijing in two hours without leaving the ground?", Mar. 22, 2012, downloaded on Jan. 25, 2013 from http://www.gizmag.com/et3-vacuum-maglev-train/21833/.

Hone et al., Innovation in Carrier Aviation, Aug. 2011, 238 pages, Naval War College Newport Papers 37, Naval War College Press, Newport, RI.

Jansen et al., "Magnetically Levitated Planar Actuator With Moving Magnets", IEEE Transactions on Industry Applications, Jul./Aug. 2008, pp. 1108-1115, vol. 44, No. 4, IEEE.

Jayawant, B.V., "Electromagnetic suspension and levitation", Rep. Prog. Phys., 1981, pp. 411-477-7, vol. 44, The Institute of Physics, Great Britain.

Johnson, Andrew P., High Speed Linear Induction Motor Efficiency Optimization, Jun. 2005, 189 pages, Massachusetts Institute of Technology.

Jung et al., "Development of a novel maglev positioner with self-stabilizing property", Mechatronics 12, 2002, pp. 771-790, 0957-4158/02, Elsevier Science Ltd.

Patterson et al., "Design and Simulation of an Electromagnetic Aircraft Launch System", Industry Applications Conference, 2002, pp. 1950-1957, vol. 3.

Science Service, "New Device Launches Planes At High Speeds", Toledo Blade, Sep. 2, 1946, 1 page, Toledo, OH.

Simaiakis et al., "Demonstration of Reduced Airport Congestion Through Pushback Rate Control", Jan. 2011, pp. 1-19, Report No. ICAT-2011-2, MIT International Center for Air Transportation (ICAT), Cambridge, MA.

Still, Aaron Michael, Electromagnetic Launchers for Use in Aircraft Launch at Sea, May 1998, 172 pages, The University of Texas at Austin.

* cited by examiner

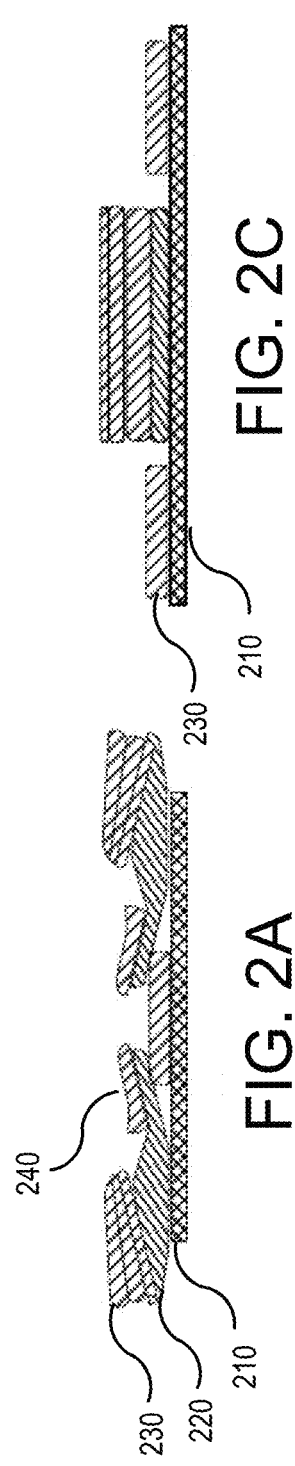
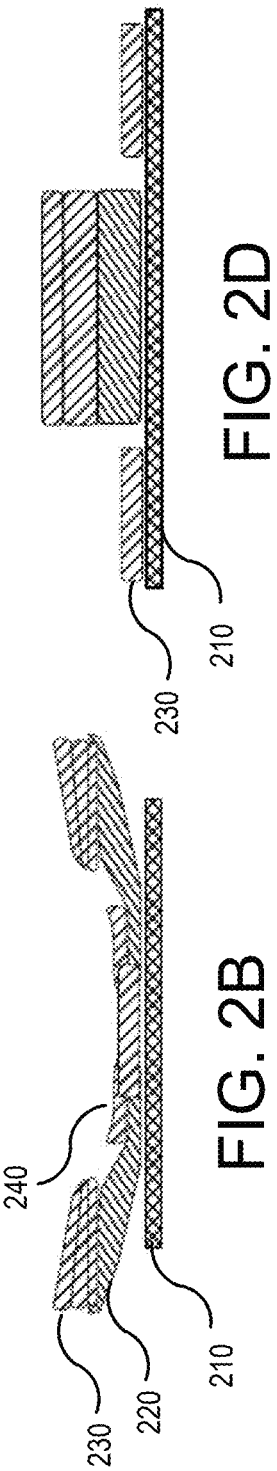
FIG. 2A  FIG. 2B  FIG. 2C  FIG. 2D

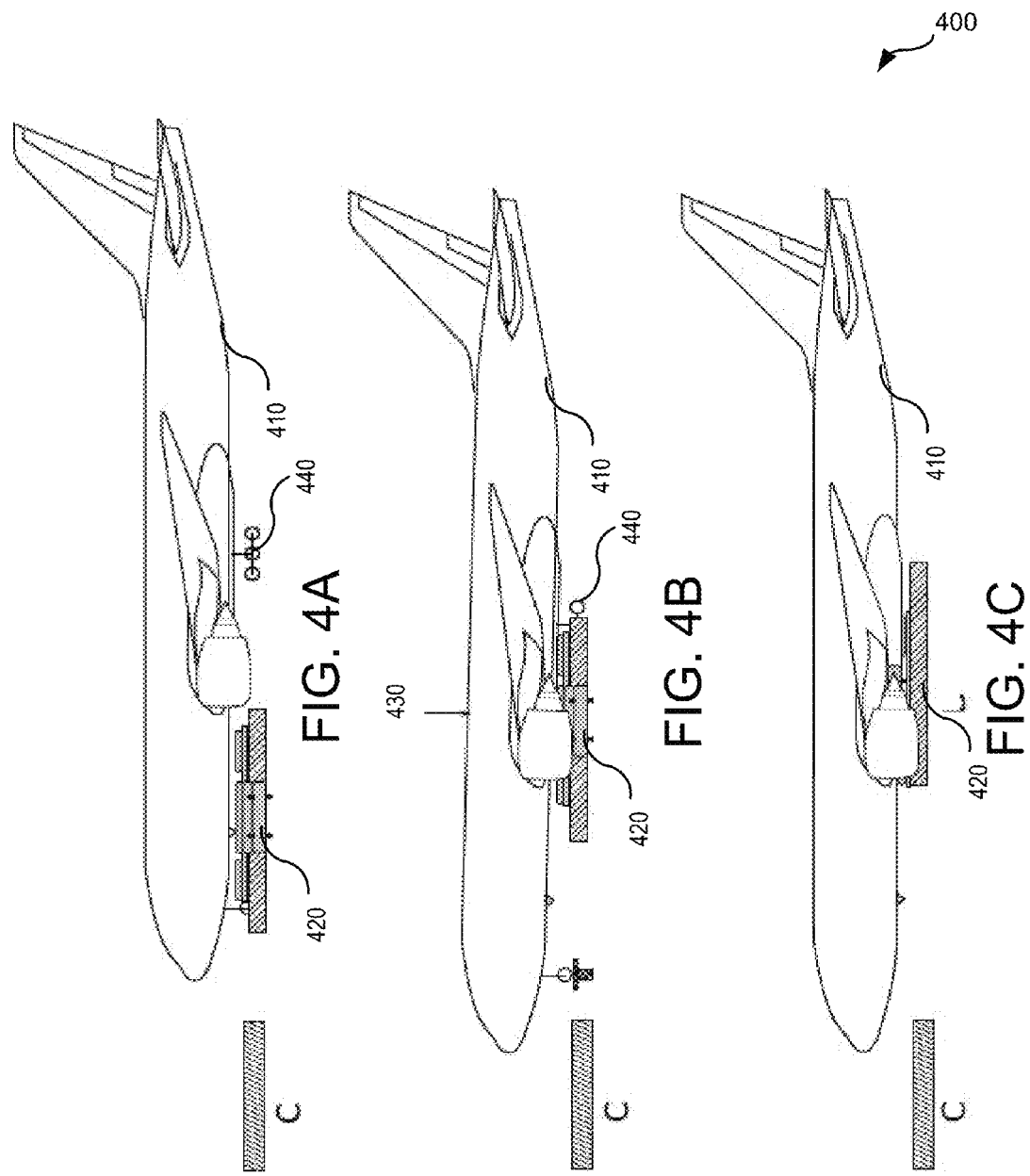

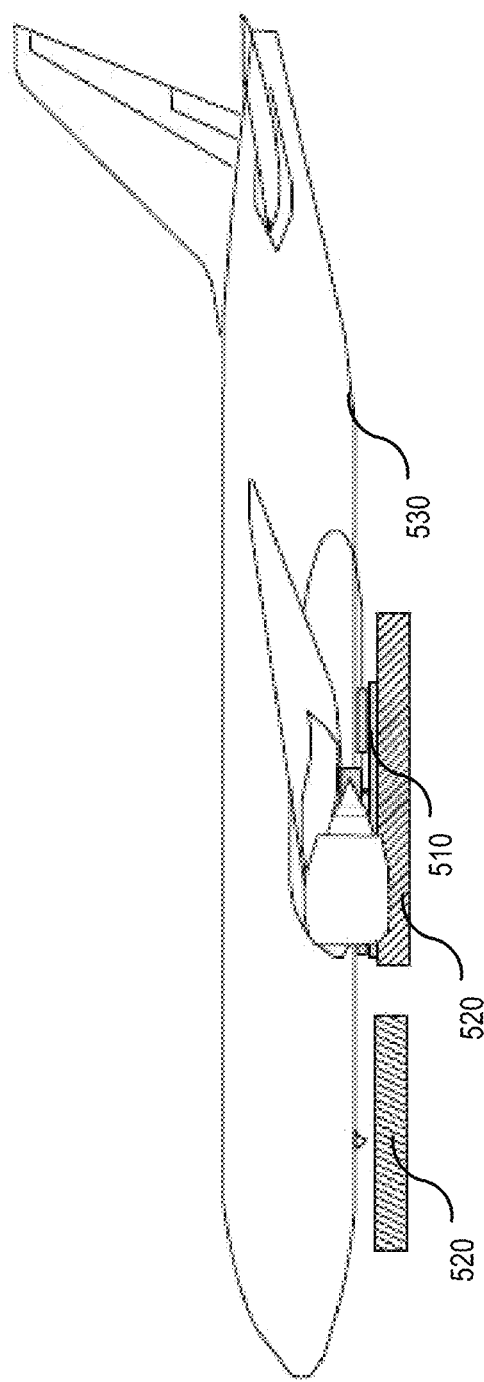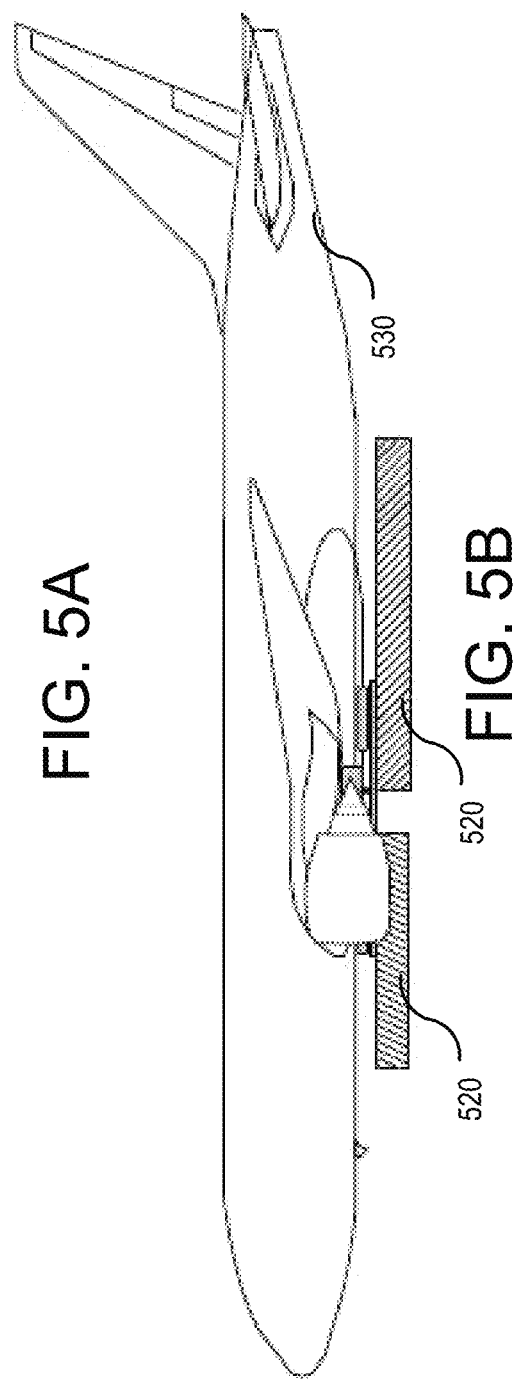

AIRPORT CAPACITY FROM TAKEOFF ASSIST

CROSS-REFERENCE TO RELATED APPLICATIONS

This application is a continuation application of U.S. patent application Ser. No. 13/747,323 entitled "AIRPORT CAPACITY FROM TAKEOFF ASSIST," filed Jan. 22, 2013, the entire content of which is expressly incorporated herein by reference.

TECHNICAL FIELD

Various embodiments of the present invention generally relate to an electromechanical thrust assembly. More specifically, various embodiments of the present invention relate to systems and methods for an electromechanical thrust assembly, which can be used to accelerate aircraft using ground-based energy during takeoff.

BACKGROUND

To meet the demand for increased air travel, aircraft have become larger with more mass, more engine power, larger wing spans and stronger landing gear. This trend has led to longer (approximately 13,000 ft) and wider (approximately 200 ft) runways for the most recently designed long haul aircraft—categorized as super jumbo jets. Wider runways allow for clearances to aircraft on adjacent runways or taxiways. Longer runways allow for longer takeoff runs and landings without requiring excessive engine sizes but are limited in takeoff velocity by tire specifications. The larger airplanes require upgrades to pavement, taxi lanes and arrival lanes due to much larger weight and turning forces.

The largest airports in the most populated cities of the world face land constraints where additional runways or longer runways require land acquisition or extending land into surrounding waters. Prior methods for extending civil airport capacity include adding additional runways at current airports, adding additional airports in neighboring regions, or some combination. The replacement of Stapleton airport near downtown Denver, Colo. with Denver International Airport to the north east of Denver provides an example of prior airport design and abandonment for more-distant vacant land. Los Angeles International Airport is bordered by the Pacific Ocean to the west, dense housing to the north and south, and mixed-use land to the east. The Federal Aviation Authority in the United States of America has acquired many acres of land to the west between the airport and ocean, and to the north. Plans to expand the airport capacity by moving runways or adding runways to the north have not overcome opposition to noise, pollution, and traffic congestion on roads leading to the airport. Heathrow Airport in London faces similar opposition to expansion.

New York's John F. Kennedy and LaGuardia airports border water and highly populated regions making expansion difficult and expensive. Relocating these airports seems intractable given the size of the public transportation structure that travelers use to access the airports. Even if support transportation was easy to reconfigure, there is no land available in these highly populated areas that would offer improved airport capacity. Expanding these two airports further into adjacent waters offers additional land but at the expense of environmental and waterway concerns. Proposals for a new floating airport in the Thames Estuary for London offers an example of political interest in complete airport relocation.

In these busy airports, runways are managed using time slots available for certain weight class of aircraft. Since all time slots at congested airports are allocated, more airplanes cannot be accommodated, so larger aircraft have been used to increase passenger and freight. Longer aircraft weigh more and produce larger wakes, potentially offsetting increased throughput with longer time slots. The variability of aircraft weight class is one of many factors affecting the dynamics of delays for different levels of utilization. As mentioned above, aircraft of heavier weight classes typically need longer runways, occupy the runway longer, but lift more mass.

New York and London regional studies estimate lost economic activity due to limited airport capacity between $100 B and $150 B over ten years for each of their regions, making the general economic benefit estimate in the order of $10 B to $15 B per year. These estimates are for economic benefits of both increased business activity and serving a growing population but do not account for indirect costs the population might incur.

The economic cost of air pollution on citizens of each city will increase as more jet fuel is used within the confined region of the airport. Newer airplanes bring improved fuel efficiency but provide added cargo capacity and higher thrust engines that burn more fuel on the runway. Cleaner burning engines, while helpful, do not overcome the rate of increasing demand for air travel in these highly dense and growing populations. In New York, new zoning allows constantly taller buildings to accommodate new business and apartments. Yet, the new people filling the taller apartments add to the overall population that must share a single-story runway that cannot build out or up. Recent estimates of economic costs of living with pollution in the Los Angeles region exceed $28 B per year. This is most concentrated to the east of the airport, but also includes pollution from all sources. Strict regulations on car emissions in the Southern California region suggest that a significant share of this cost might come from the Los Angeles International Airport.

In addition to the runway constraints, the largest airports in the most populated cities of the world face airspace constraints from overlapping flight paths from adjacent airports. New York's John F. Kennedy and LaGuardia along with New Jersey's Newark airports serve a large population of New York City and its surrounding areas. Even as the population has increased, fewer airplanes are operating through LaGuardia due to overlapping flight paths for aircraft operating out of Newark or John F. Kennedy. Passengers landing at JFK who need to travel to New Jersey face limited subway capacity and increasing delays due to cancellation of the subway expansion projects. In addition, attempts to push air traffic to airports in New Jersey to the north or south of Newark face limited ground support transportation and would further increase overlapping flight paths, the very reason cited for the need to relocate air traffic in the first place. In Report No. ICAT-2011-4 Febuary 2011, Alexander empirically estimates the capacity of airports from flight path data. However, outside the scope of the thesis are estimates for what the capacity could be within the airspace if limitations of aircraft acceleration power were overcome.

Given the land, runway, and flight path constraints discussed above, there is a need for more efficient systems and methods for effectively increasing airport throughput.

SUMMARY

Systems and methods are described for providing an electromechanical thrust assembly. In accordance with various embodiments, the electromechanical thrust assembly can be used to accelerate aircraft using ground-based energy during takeoff and decelerate aircraft to abort (or reject) takeoff. In some embodiments, a system can include a sled (e.g., a saddle shaped sled), an electromagnetic catapult, and an operational control subsystem. The sled can be designed to support an aircraft or other vehicle, which can be accelerated (and possibly decelerated) using the electromagnetic catapult along a desired path. The electromagnetic catapult (e.g., mounted to, or integrated in, an aircraft runway) can include a series of magnets, which can be activated in a sequence to propel the sled along the desired path. The operational control subsystem is designed to provide power switching times and duration to the series of magnets, thereby creating a magnetic field to lift and accelerate the sled.

In addition, some embodiments include an energy conversion system connected to the electromagnetic catapult. The energy conversion system can convert energy from a rechargeable energy storage system into electricity that powers the creation of the magnetic field.

In some embodiments, a method can include positioning (e.g., using a computer) a sled underneath a fuselage of an aircraft (e.g., with the landing gear stowed). The computer can be used to ensure that the sled is positioned at a center of mass of the aircraft. The sled can have multiple operating modes including a transfer mode and a takeoff mode. The sled can be expanded to grip the fuselage to prevent the aircraft from sliding or rotating about the center of mass during transfer and takeoff. Then, an electromagnetic catapult can be activated to accelerate the sled along a desired path on a ground surface. In addition to accelerating the sled along the desired path, the sled can be levitated above the ground surface using magnetic forces generated by a high-density permanent magnet array. A distance between the sled and the ground surface can be measured and used in actively adjusting the magnetic forces generated by the high-density permanent magnet array to keep the distance between the sled and the ground surface within a desired range.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which:

FIGS. 2A-2D illustrate various operational modes of a sled which can be used in various embodiments of the present invention;

FIG. 4A is a side view of an aircraft launch system with an aircraft entering the transfer station in accordance with some embodiments of the present invention;

FIG. 4B is a side view of an aircraft launch system in accordance with various embodiments of the present invention where the sled is positioned under the aircraft;

FIG. 4C is a side view of an aircraft launch system in accordance with one or more embodiments of the present invention where the landing gear has been stowed;

FIG. 5A is a side view of an aircraft launch system in accordance with some embodiments of the present invention where the sled is positioned to complete transfer;

FIG. 5B is a side view of an aircraft launch system in accordance with various embodiments of the present invention where a transfer has been completed;

Figure 1:
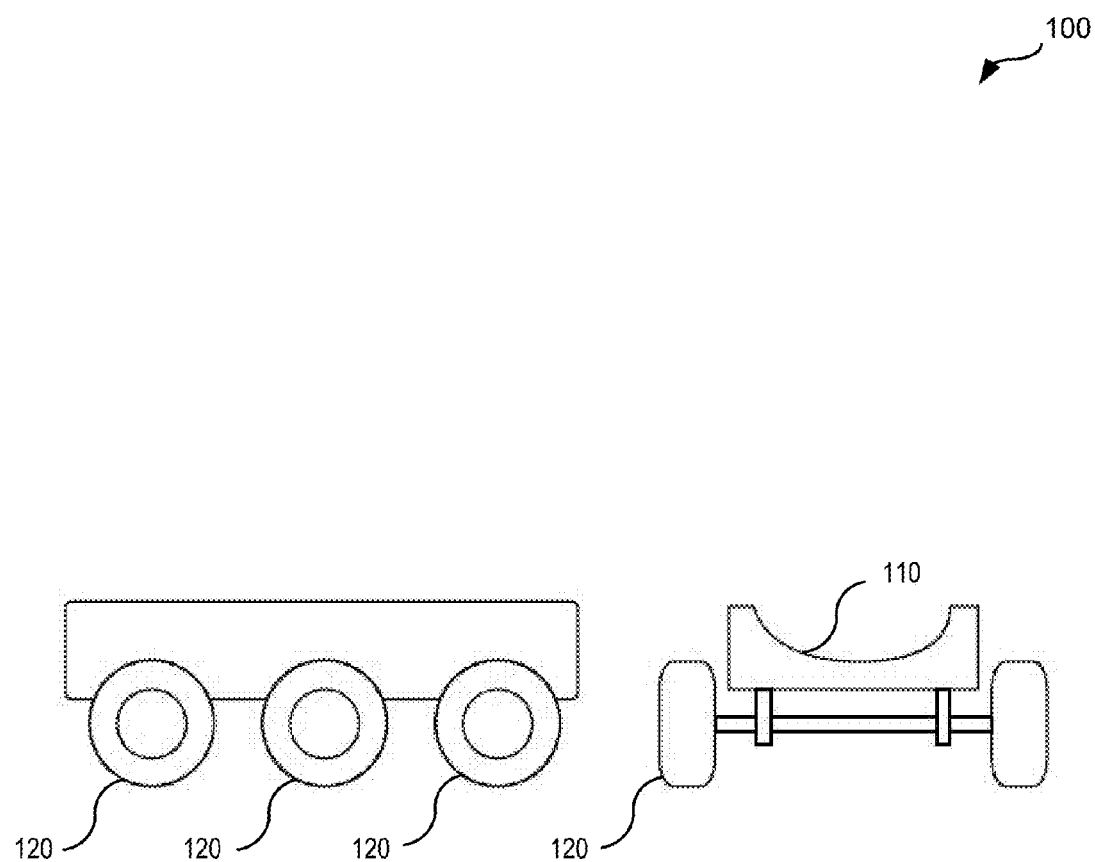
FIG. 1 illustrate front and side views of a traditional support truck for aircraft without landing gear.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to an electromechanical thrust assembly. More specifically, various embodiments of the present invention relate to systems and methods for an electromechanical thrust assembly which can be used to accelerate aircraft using ground-based energy during takeoff. By using the ground-based energy system, aircraft are provided the increased acceleration rates needed for higher takeoff velocities, and shorter takeoff lengths than possible using onboard engines and jet-fuel.

While airplanes can take off in either direction on a runway to fly into prevailing winds, issues such as noise, pollution, and safety limit the options available to flight paths of the airplanes once they takeoff from the runway. Side winds cannot be used by rotating the runway into the wind as compared to aircraft carriers at sea, although some airports are equipped with cross runways for these weather conditions. With sufficient takeoff power and acceleration provided by ground energy, fewer operational constraints from wind speed and direction impact takeoff direction decisions. Rather, pilots, and flight controllers can fly toward their flight path and experience and contribute minimally to airspace interference.

Systems that accelerate aircraft using ground-based energy exist for military training of aircraft carrier pilots. These designs rely upon specially configured aircraft with reinforced landing gear and linkages needed for connection to the catapult shoe that travels on the flight deck. This application provides very high force to mass ratios for high acceleration rates. Catapult acceleration forces combined with onboard engines ensure takeoff of fighter aircraft and small cargo planes within a short distance. Catapults extend the capacity of the carrier—as a mobile airport—to launch heavier aircraft using less flight deck surface area. Aircraft carriers operate in hostile combat situations where they support the pilots' ability to reach and return from missions or defend the carrier itself. Civilian airspace does not contend with adjacent airports moving relative to one another. Military aircraft also contain their own radar systems for detecting other aircraft, where civilian aircraft rely upon flight controllers using ground radar sweeps of transponders on aircraft for location. Even with the next generation of navigation and airspace control, civilian aircraft will forward their location to ground systems rather than operate onboard radar.

Several devices have been proposed to launch military fighter jets from the deck of an aircraft carrier. These involve steam, hydraulics, and/or other mechanical energy conversion systems designed to accelerate an airplane to takeoff velocity. The purpose and design of these systems, independent of energy form used, is to launch weapons for defensive or offensive military operation. In these traditional designs, full engine thrust and full assist power is often used to overcome the need to achieve takeoff velocity over a large set of weather conditions while at sea.

Aircraft carriers often steer so that the takeoff direction for departing aircraft have a maximum head wind. This maximum head wind thus creates conditions for maximum airflow into the turbine engine and over the wings of the departing aircraft. Aircraft carriers also typically travel at full velocity during aircraft launch to ensure maximum head wind and ensure the lift is sufficient for flight with maximum cargo weight. In addition to adjusting the heading of the aircraft carrier, many carriers also use aircraft catapults as a form of assisted take off. These traditional catapult systems typically consist of a track built into the flight deck of the aircraft carrier. A large piston or shuttle is attached through the track to the nose gear of the aircraft. A release bar is often used to hold the aircraft in place as steam pressure builds up. Once enough pressure has been built, the aircraft is pulled along the deck at high speed. However, steam-based and other traditional systems currently in use are often inefficient and have limited capabilities.

While traditional systems for providing additional acceleration to aircraft in the presence of winds have included steam-based and pulley-based catapults for accelerating aircraft. However, none of these traditional systems enhance throughput for the amount of mass per takeoff per unit of time while increasing safety and reducing aviation fuel needed to begin the flight. While reducing variability of arrival times of airplanes at the runway can provide for consistent queue lengths, there are two needs this does not address. First, the queue length is more dependent upon the average capacity of the runway and the volume of traffic demanded by the airport. Second, airplanes should wait for runway capacity before pulling away from the gate. There is no reason aircraft must wait in a queue to takeoff, unless some event transpired between entering the queue and takeoff. The main cause of long lines to takeoff is almost completely due to throughput, utilization, or average capacity of the runway. Significantly more capacity is needed so that scheduled flights takeoff on time without delay. Managing taxi time variability is less important than vastly decreasing taxi times. A mean taxi time of thirty seconds with a very low variability is less beneficial to passengers than a mean taxi time of ten seconds with a very high variability.

A powered nose aircraft wheel system that can provide enough propulsion to allow the pilot to pull away from the gate without requiring ground service equipment. In addition, the pilot could taxi using the system either alone if powerful enough, or with main engines for periods of acceleration. As long as the torque provided by the motor exceeds the rolling resistance of the wheels, the system would aid taxi movement. However, this type of system is not practical for the application of launching large aircraft due to the power needed to develop significant velocity for lift. The use of the auxiliary power supply onboard the aircraft would only be sufficient for moving the wheel under no load to pre-spin the wheel for landing. Whether the auxiliary power supply would provide sufficient energy needed to power the motors in the wheels for taxi would depend upon the rolling resistance of the aircraft, the steering direction, and the load of the auxiliary system for other functions. Obviously, if the system provides enough power to move the aircraft, the air traffic controllers can signal to the pilot to delay taxi through telecommunication networks dedicated to FAA frequencies. The same is true for providing estimated time of arrival (ETA) at the queue waiting for takeoff at the end of the runway used for departures. Various embodiments of the present invention obviate the need to actively manage the taxi process currently used to reduce variability in the arrival of airplanes at the runway for takeoff.

In accordance with various embodiments of the present invention, airplanes (e.g., commercial passenger, military, unmanned airplanes, and freight airplanes) can be loaded onto a saddle-shaped sled that supports and balances the airplane in lieu of landing gear aboard the aircraft. The sled can be designed to levitate above the ground using high-density permanent magnet arrays (e.g., Halbach arrays). Then, magnetic levitation (maglev) forces may be varied along the assembly to account for lift provided by airflow over the wings. In addition, some embodiments provide for one or more of the following features: 1) low emission during takeoff; 2) low noise during takeoff; 3) takeoff propulsion without added fuel or weight to the aircraft; 4) safer takeoff operation; 5) thrust to safely overcome any single engine failure during takeoff; 6) dramatically increase capacity of an airport, close groups of airports, and related airspace; 7) reduce taxi times; and 8) reduce the variability of process times and arrival times of aircraft.

In various embodiments, a takeoff assist assembly is provided that includes energy storage, energy conversion, linkage, operational control subsystem, and safety systems that together provide the needed acceleration. Ground-based energy provides the electricity needed to accelerate the airplane by use of an electromagnetic catapult mounted to the runway. In those situations where instantaneous power available is below that needed during acceleration, energy storage systems capable of higher instantaneous power output will be used and re-charged between takeoffs. Sufficient energy storage at the site of launch will ensure no interruptions of power delivered from suppliers will interfere with the safety or schedule of the next takeoff.

Various embodiments of the present invention provide a means of accelerating airplanes using a ground-based energy source. The system includes power distribution equipment from the energy supply, grid connection equipment where electricity supply is sufficient, or onsite generation. Power distribution components can be used to route electricity to submodules that energize sections of the electromagnetic catapult. A control system that produces the necessary power switching time and duration to each submodule in tandem may provide the change to the magnetic field needed to ensure measured forces are applied to the saddle during acceleration and during the return of the saddle to its starting location for repeated cycles. The control system regulates power to ensure combined lift forces during acceleration produce magnetic levitation.

While, for convenience, embodiments of the present invention are described with reference to assisted takeoffs, embodiments of the present invention are equally applicable to movements and vehicles. For example, these techniques are equally applicable to moving vehicles from one place to another. In addition, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary channels or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

The term "takeoff" is used to refer to both the event of the takeoff and the action to take-off as indicated by the context of the use of the term.

General Description

FIG. 1 shows a side and front view of a traditional support truck 100 for aircraft without landing gear. As illustrated in FIG. 1, the support truck 100 has a cavity 110, which allows the aircraft to sit within and is designed to support an aircraft during taxiing and takeoff. In some variations of this design, the desired angle of attack of the wing may be achieved by controlling the angle of truck 100 and an aircraft relative to the ground. In addition, the primary source of energy for takeoff is provided by the main onboard engines of the aircraft, which cause wheels 120 to roll along the ground. With this approach, the design overcomes the limit of the fixed wing geometry by the support producing the same effect of slats and flaps for a typical aircraft. This is important for applications where fixed wing aircraft are required such as with a space shuttle.

FIGS. 2A-2D show a perspective view of various operational modes of a sled 200 which can be used in various embodiments of the present invention. In some embodiments, a takeoff assist assembly uses ground equipment, such as sled 200, to provide the horizontal velocity needed to achieve lift. Airplanes can be transferred to sled 200 prior to takeoff. Sled 200 is designed to support the weight of the aircraft during ground transfer and acceleration for takeoff.

In accordance with various embodiments, sled 200 can include a rigid, stationary (to the airport) sled frame 210 coupled to an aircraft support lever 220 having a set of wing support bags 230 and fuselage support bags 240. Stationary (to the airport) sled frame 210 can be made of steel, aluminum alloys, titanium, carbon composites, fiberglass-reinforced-epoxies, and/or other plastics or metals, which together provide for needed strength of joints, welds, axles, and planes. Aircraft support lever 220 may be made of similar composites, alloy metals, and steel. In some embodiments, the fuselage and wing support bags can be made from synthetic rubber reinforced with high-strength composite mesh fabrics such as Kevlar or Nomex. It is envisioned that the bottom of the airbags will be mechanically connected to the sled frame.

The support lever 220 can be adjusted into different positions creating multiple operating modes for sled 200. These modes can include a transfer mode as illustrated in FIG. 2A, a takeoff mode as illustrated in FIG. 2B, an unlocked mode as illustrated in FIG. 2C, and a locked mode as illustrated in FIG. 2D. The transfer mode illustrated in FIG. 2A is designed to receive the aircraft. In some cases, sled 200 may be navigated underneath the fuselage of the aircraft to a desired position (e.g., center of mass of the aircraft). After transfer to the saddle, pilots can stow the landing gear and the operational mode of the sled can be set to the takeoff mode. In the takeoff mode, the support lever 220 can be raised so that the wing support bags 230 and fuselage support bags 240 are fully engaged.

In addition, slat and flap settings can then be set for a takeoff given the weight of the aircraft, the acceleration force available from the catapult, and any acceleration force the pilot intends to provide from the onboard engines. The pilot then gives the signal to catapult operators to engage the catapult, and increases the engine thrust to proceed to vertical climb.

The two modes of the sled provide clearance between the airbags and fuselage while the aircraft is supported by landing gear. Once the aircraft arrives at the staging area via a tow truck or taxi, the sled and related support assembly are moved under the aircraft fuselage. Once under the fuselage, operators lock the sled into takeoff position and raise the assembly to provide support to the aircraft while landing gear is stowed. This is useful for some aircraft that have the bottom of their wings offset from the bottom of the fuselage. The clearance for some aircraft may be met simply by deflating the airbags during positioning under the fuselage. In the event the sled assembly moved under the aircraft can be made lower to provide the clearance via hydraulic jacks or variable magnetic force, then the sled may always be operated in the position for takeoff.

Figure 3:
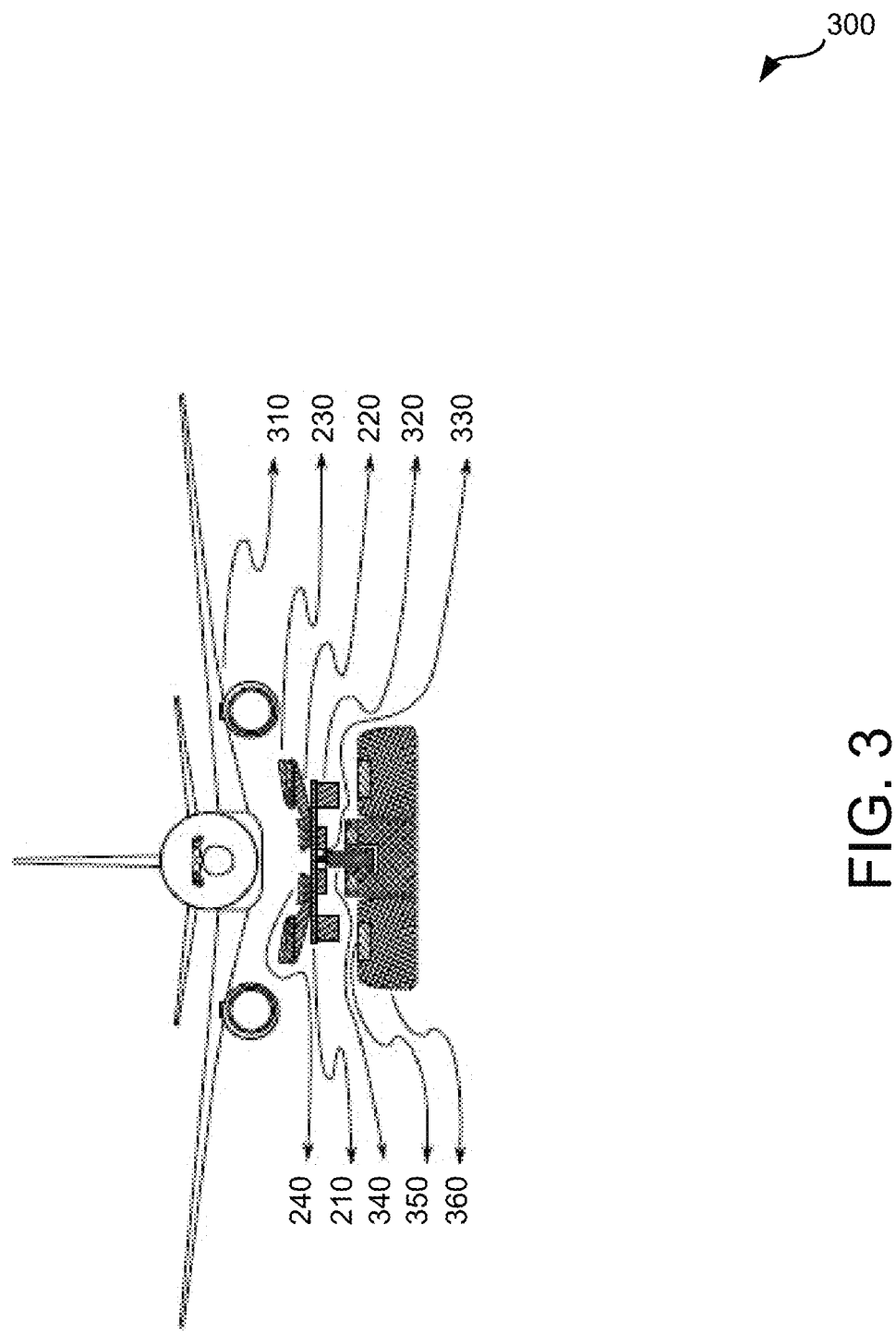
FIG. 3 is a front elevation view of an aircraft launch system in accordance with one or more embodiments of the present invention.

FIG. 3 is a front elevation view of an aircraft launch system in accordance with one or more embodiments of the present invention. As illustrated in FIG. 3, aircraft 310 is taking off using the aircraft launch system. The aircraft launch system includes stationary sled frame 210, aircraft support lever 220, wing support bags 230, fuselage support bags 240, permanent magnets 320, catapult linkage 330, catapult shoe 340, maglev track magnets 350, and maglev frame/catapult rail 360.

Permanent magnets 320 create a persistent magnetic field to assist in lifting sled frame 210 above maglev frame 360. In addition, the magnetic field created by the permanent magnets 320 can interact with a moving magnetic field created by maglev track magnets 350 to accelerate airplane 310 along maglev frame/catapult rail 360. Catapult linkage 330 couples sled frame 210 to the catapult shoe 340. While not illustrated in FIG. 3, some embodiments provide for multiple catapult rails 360. The number of rails actively engaged can be static or dynamically determined based on the weight, size, type, or other characteristic of the airplane. In some cases, current weather conditions may be used to determine how many rails are activated or used.

FIGS. 4A-4C show different views of aircraft 410 entering the transfer station of an aircraft launch system in accordance with some embodiments of the present invention. Sled 420 in the unlocked mode is positioned underneath aircraft 410 in a desired position. In some embodiments, sled 420 may be electronically or manually controlled and assisted by a computer to find the center of gravity 430 of aircraft 410. Sled 420 may be designed (e.g., a saddle shape) to conform to the fuselage below the center of mass of airplane 410 and is coated to reduce any sliding between the saddle and fuselage during acceleration.

Aircraft 410 is moved from resting on its landing gear 440 to resting on the saddle by the saddle moving from behind aircraft 410 between landing gear 440. Ground equipment drivers or automated equipment may position sled 420 under the belly of aircraft 410 guided by computer to center the saddle where the center of mass resides along the length of the fuselage fore and aft. As illustrated in FIG. 4B, sled 420 transitions from an unlocked operating mode to a transfer mode as the grips expand up the side of the fuselage to prevent sliding or rotation about the center of mass. Coating materials and vacuum created from airflow redirected during acceleration increases adhesion between the sled and fuselage. The landing gear 440 of aircraft 410 may then be retracted as illustrated in FIG. 4C to allow for efficient takeoff.

FIGS. 5A-5B illustrate side views of an aircraft launch system where sled 510 is transferred in accordance with some embodiments of the present invention. As illustrated in FIGS. 5A-5B, the launch assembly can include one or more sleds 510 and one or more maglev tracks or guideways 520 having one or more linear motors to accelerate sled 510. Airplanes 530 are loaded onto sled 510. Sled 510 may be a saddle-shaped sled or have another shape designed to support and balance airplane 530. The aircraft launch system levitates sled 510 above the ground using high-density permanent magnet arrays. Magnetic levitation (maglev) forces are varied along the assembly to account for lift provided by airflow over the wings. In other embodiments, the aircraft launch system can levitate sled 510 using other mechanisms (or a combination of mechanisms) for creating lift such as compressed air distributed along the guideway to support the sled during aircraft transfer or acceleration. FIG. 5B shows sled 510 completely transferred onto a desired guideway 520 which will guide aircraft 530 during the launch.

Figure 6:
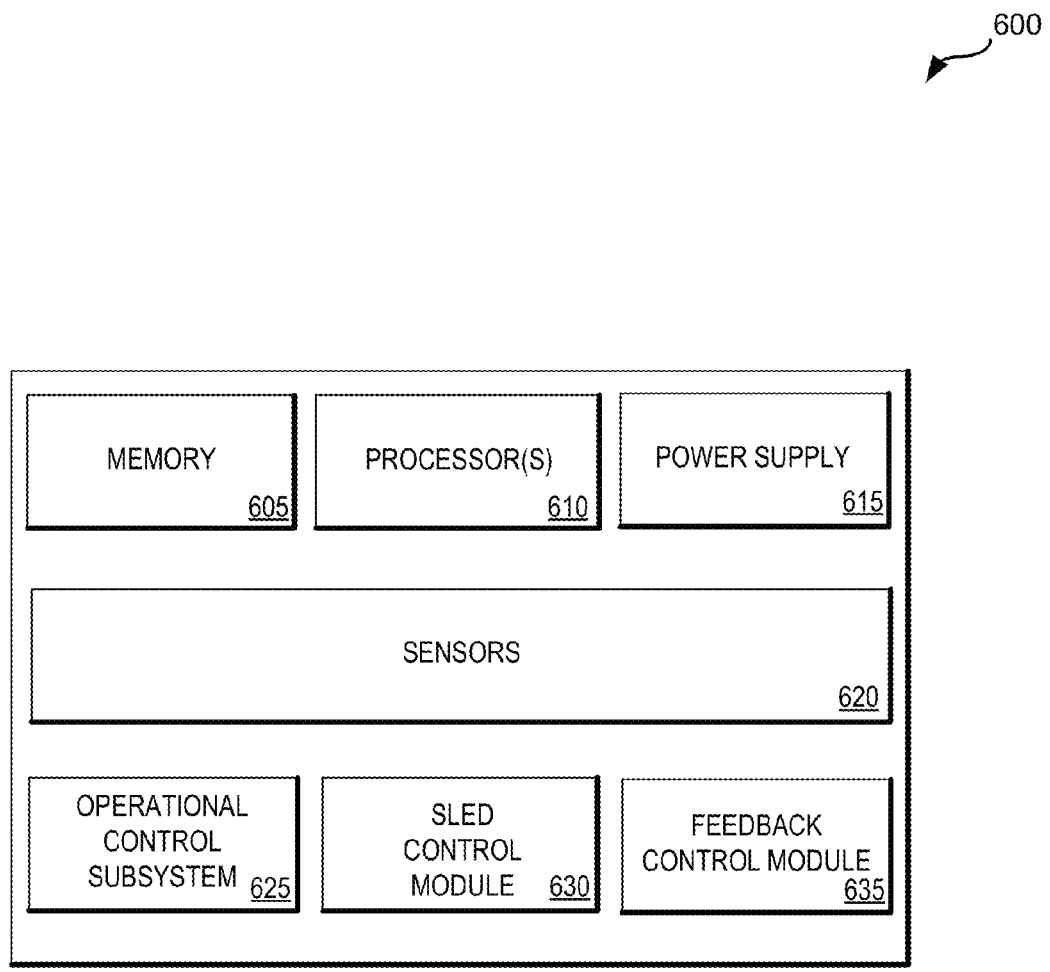
FIG. 6 shows a block diagram with components of an aircraft launch system in accordance with one or more embodiments of the present invention.

FIG. 6 shows a block diagram with components of an aircraft launch system 600 in accordance with one or more embodiments of the present invention. According to the embodiments shown in FIG. 6, the system can include memory 605, one or more processors 610, power supply 615, sensors 620, operational control subsystem 625, sled control module 630, and feedback control module 635. Other embodiments of the present invention may include some, all, or none of these modules and components along with other modules, applications, and/or components. Still yet, some embodiments may incorporate two or more of these modules into a single module and/or associate a portion of the functionality of one or more of these modules with a different module. For example, in one embodiment, operational control subsystem 625 and sled control module 630 can be combined into a single module.

Memory 605 can be any device, mechanism, or populated data structure used for storing information. In accordance with some embodiments of the present invention, memory 605 can encompass any type of, but is not limited to, volatile memory, nonvolatile memory, and dynamic memory. For example, memory 605 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 605 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 605.

Memory 605 may be used to store instructions for running one or more applications, systems, or modules on processor(s) 610. For example, memory 605 could be used in one or more embodiments to house all or some of the instructions needed to execute the functionality of sensors 620, operational control subsystem 625, sled control module 630, and/or feedback control module 635.

Power supply 615 can be used to provide power to the different components of the aircraft launch system. For example, power supply 615 can be used to power sensors 620 and/or other components. Sensors 620 can be any type of sensor for measuring environmental conditions or user interactions. For example, sensors 620 may include one or more temperature sensors, wind speed sensors, distance sensors, pressure sensors, magnetism sensors, and/or motion sensors. The outputs from these sensors can be used in computing inputs for levitating and/or accelerating the sled to achieve a desired trajectory profile.

Some embodiments can use a calibration algorithm to ensure that the maximum acceleration rate is not exceeded during takeoff. Each section of the catapult will have small variations in the forces applied for a given mass. For example, one algorithm relies upon distance sensors to adjust the force of the acceleration to ensure the desired acceleration is achieved within safe force limits of the aircraft. The measured mass of the aircraft in the staging area can aid the control system of assessing distance versus energy required for acceleration and time window estimate for when the system should sense takeoff and switch to deceleration of the sled.

In other embodiments, the algorithm records the energy used to achieve takeoff velocity, measured mass of the aircraft, together with temperature, pressure, wind speed and direction, actual velocity at takeoff, aircraft slats and flaps settings to better estimate the time of takeoff and when to deflate the airbags and decelerate the sled. These optimization computations can be multi-parameter statistical predictions based upon calibrated launch system measurements, model of the aircraft and required safety measurements.

Operational control subsystem 625 can compute power switching times and duration to be applied to magnets (e.g., electromagnets) located with the guideways (e.g., in a linear motor). This creates a change in an electromagnetic field created by the magnets and accelerates a sled in a desired direction along the guideways. In addition, operational control subsystem 625 can receive and/or transmit inputs to sled control module 630. These inputs can be used to change the operational mode of the sled and/or receive information regarding the current state of the sled. Feedback control system 635 can compute the amount of power needed to maintain the sled at a constant distance above the guideway during acceleration.

Figure 7:
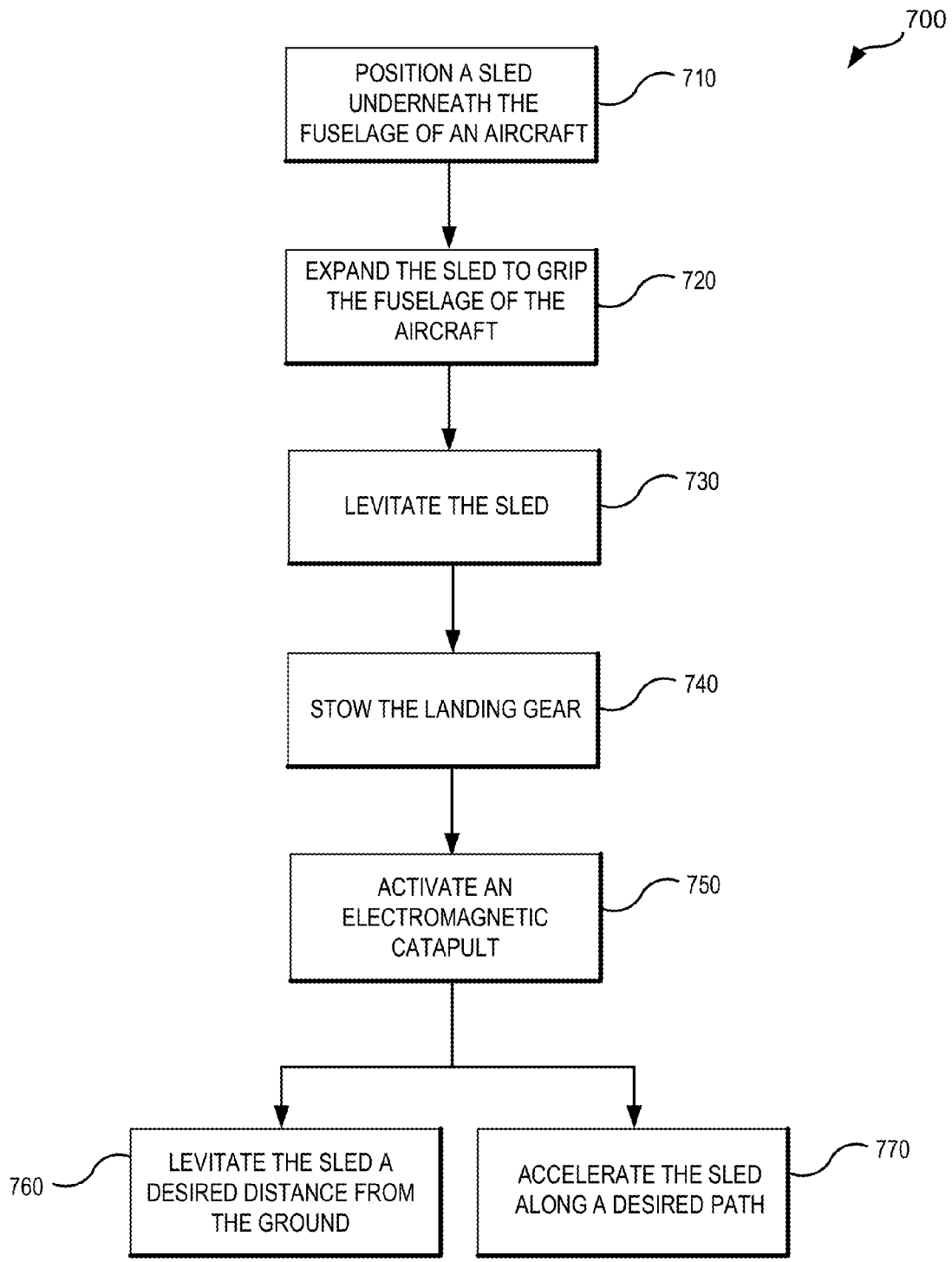
FIG. 7 is a flowchart with a set of operations for launching an aircraft in accordance with various embodiments of the present invention.

FIG. 7 is a flowchart with a set of operations 700 for launching an aircraft in accordance with various embodiments of the present invention. As illustrated in FIG. 7, position operation 710 is used to position a sled underneath the fuselage of an aircraft. In some embodiments, a computer can be used to ensure that the sled is positioned at a center of mass of the aircraft. The center of mass may be programmed into a database, which the computer can access. In other cases, additional measurements can be used to determine and/or refine the center of mass of the aircraft.

The sled can have multiple operating modes including a transfer mode and a takeoff mode. Expansion operation 720 expands the sled to grip the fuselage of the aircraft. The expansion helps prevent the aircraft from sliding or rotating about the center of mass during transfer and takeoff. Once the aircraft is secure on the sled, levitation operation 730 can be used to levitate the sled. In some embodiments, levitation operation 730 can activate (e.g., open loop) a set of permanent magnets. Then, the landing gear (if any) can be stowed during stowing operation 740. Activation operation 750 can then be used to activate an electromagnetic catapult system.

The catapult system can use levitation operation 760 to levitate the sled above one or more guides or railways at a desired distance. Various levitation control systems can be used to ensure that the distance is maintained as the sled is accelerated along a desired path during acceleration operation 770. In order to levitate and accelerate the sled, the catapult system can actively control the magnetic forces generated by a high-density permanent magnet array and/or linear motors.

One advantage of using various embodiments of the present invention is the increase in the collective capacity of one or more airports whose associated flight paths may overlap. In addition, taxi times may also be reduced as a result of lower process time and customer wait time. Reductions in the variability of taxi-staging-takeoff process times (e.g., as measured by the standard deviation divided by the mean) can also be achieved.

Figure 8:
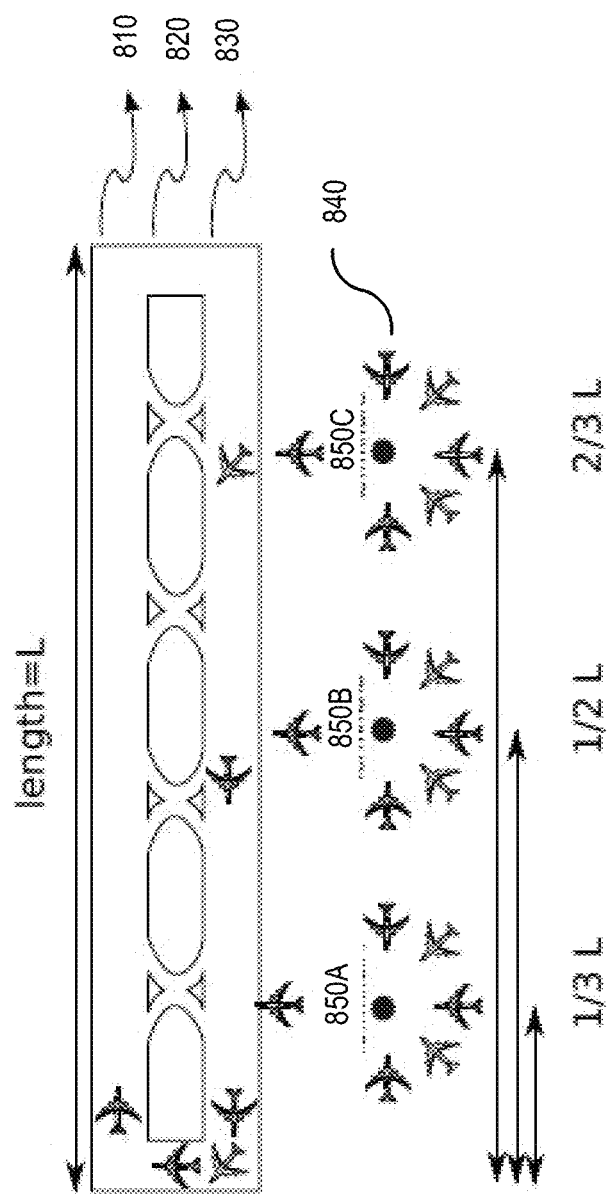
FIGS. 8 and 9 provide an overhead view a traditional airport and runway layouts.
Figure 9:
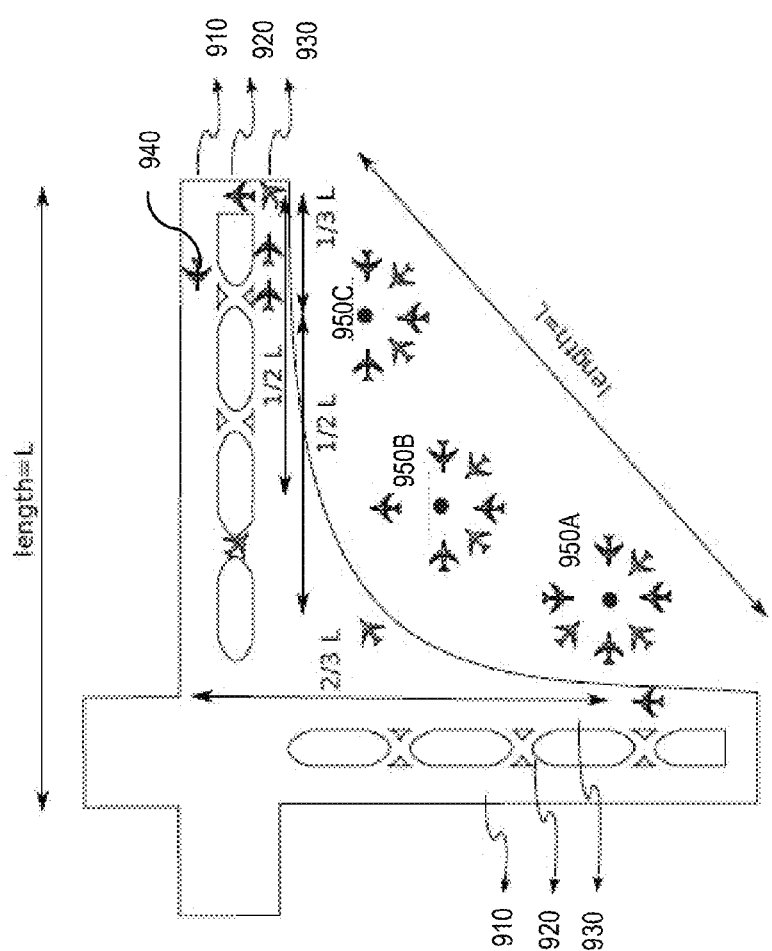

FIGS. 8 and 9 provide an overhead view of a traditional airport and runway layouts. In particular, FIG. 8 shows a single runway 810 having an early runway exit 820 and taxiway 830. Planes 840 leave from terminals 850A-850C and taxi under their own power to the runway. The following chart shows the mean taxi distance, mean taxi time, mean queue time, takeoff duration, and the number of independent simultaneous takeoffs of a typical airport with this traditional configuration.

| Item | | |
|---|---|---|
| Metric | estimate | source |
| mean taxi distance | ½ L | derived |
| mean taxi and queue time | 960 sec | Best Quartile all Airlines from JFK August 2012(BTS) |
| typical takeoff duration | 42 sec | derived |
| total process time | 1062 sec | |
| independent simultaneous takeoffs | 1 | observation |

FIG. 9 shows two perpendicular runways 910 having early runway exit 920 and taxi ways 930. Planes 940 leave from terminals 950A-950C and taxi under their own power to one of the runways 910. The following chart shows the mean taxi distance, mean taxi time, mean queue time, takeoff duration, and the number of independent simultaneous takeoffs of a typical airport with this configuration.

| Item | | |
|---|---|---|
| metric | estimate | source |
| mean taxi distance | ⅞ L | derived |
| mean taxi and queue time | 1140 sec | Best Quartile Delta LGA August 2012(BTS) |
| typical takeoff duration | 42 sec | IATC path |
| total process time | 1282 sec | |
| independent simultaneous takeoffs | 1 | observation |

Figure 10:
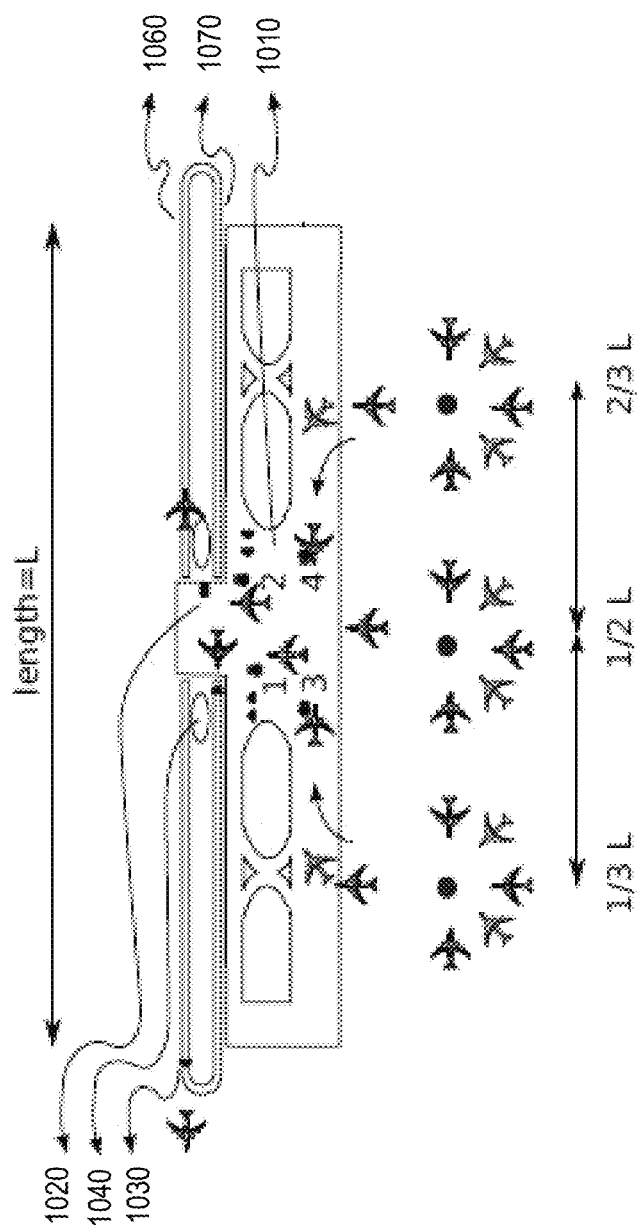
FIG. 10 is an overhead view of the aircraft thrust system providing reduced taxi distance and ground support prior to takeoff in accordance with one or more embodiments of the present invention.

FIG. 10 is an overhead view of the aircraft thrust system providing reduced taxi distance and ground support prior to takeoff in accordance with one or more embodiments of the present invention. As illustrated in FIG. 10, the taxi and thrust system can include one or more staging areas, maglev rails housed within a support beam, and a plurality of sleds discussed above. Various embodiments provide for independent mechanisms for levitation and propulsion. High acceleration rates, high mass variability, and short duration cycles benefit from fast discharge energy components like flywheels controlled by localized excitation along the rail. Magnetic levitation forces in this application start out large while the aircraft is stationary, but decrease nonlinearly as lift from the wings increases with air velocity.

Figure 11:
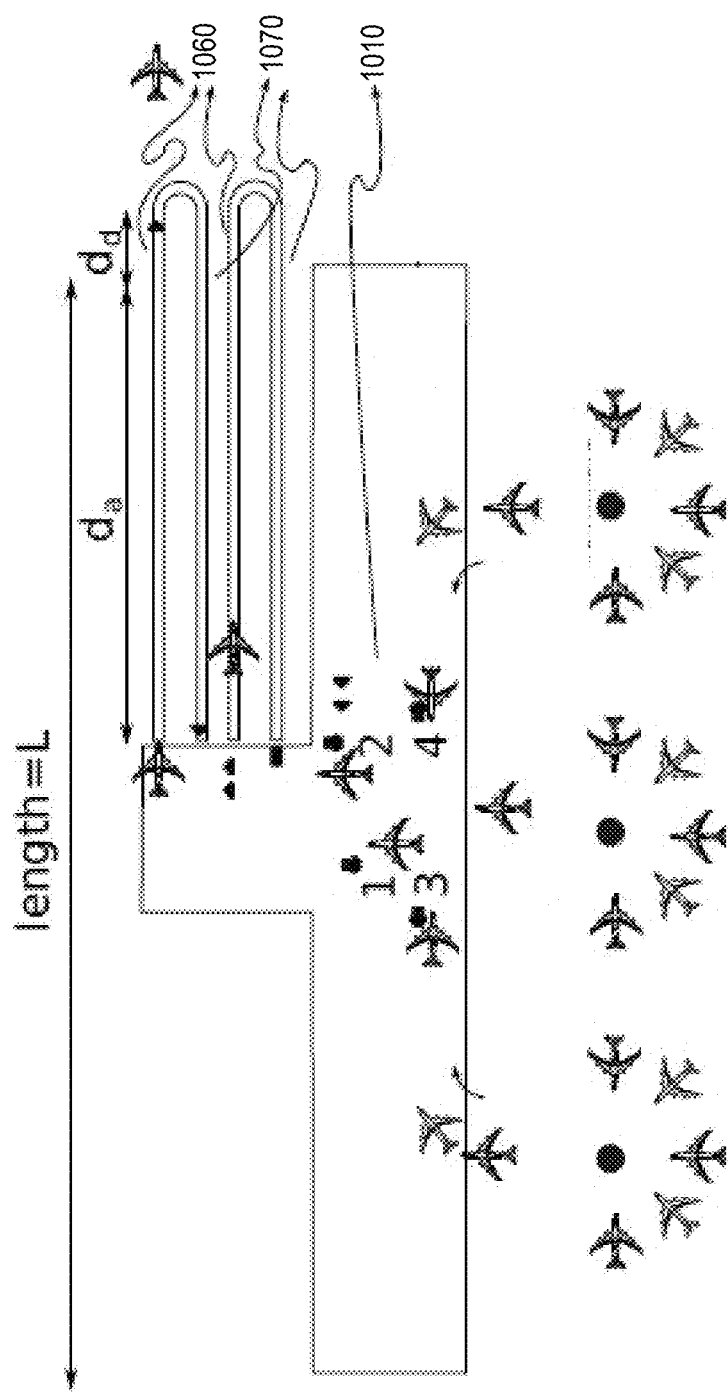
FIG. 11 is an overhead view of a parallel topology aircraft thrust system in accordance with some embodiments of the present invention.

The inline configuration shown in FIG. 10 includes two independent aircraft thrust system assemblies, which are configured to operate along a line but in opposite directions. FIG. 11 is an overhead view of a parallel topology aircraft thrust system in accordance with some embodiments of the present invention. In both the embodiments shown in FIGS. 10 and 11, ground operators use staging areas to ready aircraft for transfer to the maglev rail for takeoff. The load cells, supporting electronics, communications and a computer system measure the location of the center of mass of the aircraft and guide operators to properly position the sled under the aircraft. If the rails are oriented such that East faces the right side of the figure, then aircraft can takeoff in the direction most suited to the overall management of airspace and the destination of the flight.

Each staging area 1010 illustrated in FIGS. 10 and 11 can use a transfer beam 1020 where aircraft are moved by compressed air or rollers and powered tractor or compressed-air-powered dolly. Positioning the sled 1030 under the aircraft requires location of its center of gravity. Each staging area houses load cells, supporting electronics, communications and a computer system that provide center-of-gravity location and weight measurements for the ground crew and pilots. The staging area provides the ground crew with access to compressed air needed for the airbags on the sled to support the aircraft while stowing landing gear. In addition, the compressed air is used to move the portable section of the maglev rail under the sled and aircraft using prior-art. Staging areas 1010 may also provide de-icing infrared heaters and roofs for airports that experience winter weather. Controllers 1040 can be positioned to activate the catapults upon signal from the pilots. Sled 1030 is accelerated using takeoff assist system 1060. Once the airplane leaves the ground, return 1070 returns the sled to one of the staging areas.

The following charts show the mean taxi distance, mean taxi time, mean queue time, takeoff duration, time to climb out, and the number of independent simultaneous takeoffs of a typical airport with this inline configuration.

| Item | | |
|---|---|---|
| Metric | estimate | source |
| mean taxi distance | ⅑ L | derived |
| mean taxi wait (30 mph) | 36 sec | derived |
| mean maglev transfer wait | 120 sec | estimate |
| mean takeoff queue wait | 30 sec | estimate |
| typical takeoff duration | 16 sec | derived |
| total process time | 196 sec | |
| independent simultaneous takeoffs | 2 | topology |

| Item | | |
|---|---|---|
| metric | Estimate | source |
| mean acceleration | 1.333 g | goal |
| $v_{takeoff}$ | 208 m/s | 13 m/s * 16 s, goal |
| $d_a$ | 1.6 km (1.28 mi) | .5 * 13 * $16^2$ |
| $t_d$ | 2.1 s | ~10 g |
| $d_d$ | 220 m | .5 * 100 * $2.1^2$ |
| L ≈ | 3.2 km (2.5 mi) | 1.6 km * 2 |
| independent simultaneous takeoffs | 2 | topology |
| time to climb out | 150 s | 30 km/0.208 km/s |

| Item | | |
|---|---|---|
| L ≈ | 1.6 km (1.25 mi) | 1.6 km |
| semi-independent simultaneous takeoffs | 2 | topology |
| time to climb out ≈ | 210 s | 30 km/0.208 km/s + turnaround |

Various embodiments of the present invention increase the passenger and freight throughput of an airport's runways while requiring no additional land. Embodiments of the takeoff assist assembly provide increased rates of acceleration for aircraft beyond that provided by onboard engines. The higher acceleration rates allow aircraft shorter takeoff lengths and less time on the runway. The lower angle of attack required for higher velocity takeoffs reduces the wake size experienced on the runway. In addition, the takeoff assist assembly provides for a higher takeoff velocity that allows aircraft to carry more total combined mass of cargo and fuel. The increased takeoff velocity allows higher lift forces from airflow over wings while allowing for reduced drag induced from a higher angle of attacks settings for slats and flaps. Higher utilization of aircraft leads to fewer flights needed for a given airport service level, providing spare capacity and slack for bad weather conditions.

In addition to providing shorter taxi runs, aircraft no longer need to taxi to the far corners of the airport. Shorter taxi runs from terminals to the center of the runways reduces time spent in transit to the takeoff position which reduces fuel use, pollution and noise from airport operations. Aircraft taxi to the center of a runway and then enter a staging area for takeoff in one of two directions as determined by flight paths and flight operators. The ability for aircraft to takeoff from the center of the runway allows for simultaneous takeoffs further increasing takeoff capacity.

By taking off from staging areas near terminals, aircraft no longer need to taxi to the far corners of the airport. The ability for aircraft to takeoff from one end of the system provides controllers the higher takeoff acceleration and shorter taxi time since even one rail is shorter than typical runways. The ability for aircraft to takeoff from either end of the system on one or more rails provides controllers more flexibility in managing takeoffs, further increasing takeoff capacity. The ability for aircraft to takeoff from either end of the system on one or more rails increases the overall capacity of the airport. The lower overall taxi and queue duration, lower takeoff duration and lower climb duration increases the overall capacity of the airspace by decreasing the time an aircraft spends leaving the airspace. In addition, various embodiments provide a rate of acceleration that allows for higher airspace throughput by using higher takeoff velocities to allow pilots to clear the general airport airspace faster than available from slower takeoffs using onboard engines. Air traffic controllers also have more flexibility in meeting the demand for air travel while increasing safety. Departing aircraft have a faster climb reducing the time spent at low speeds.

Figure 12:
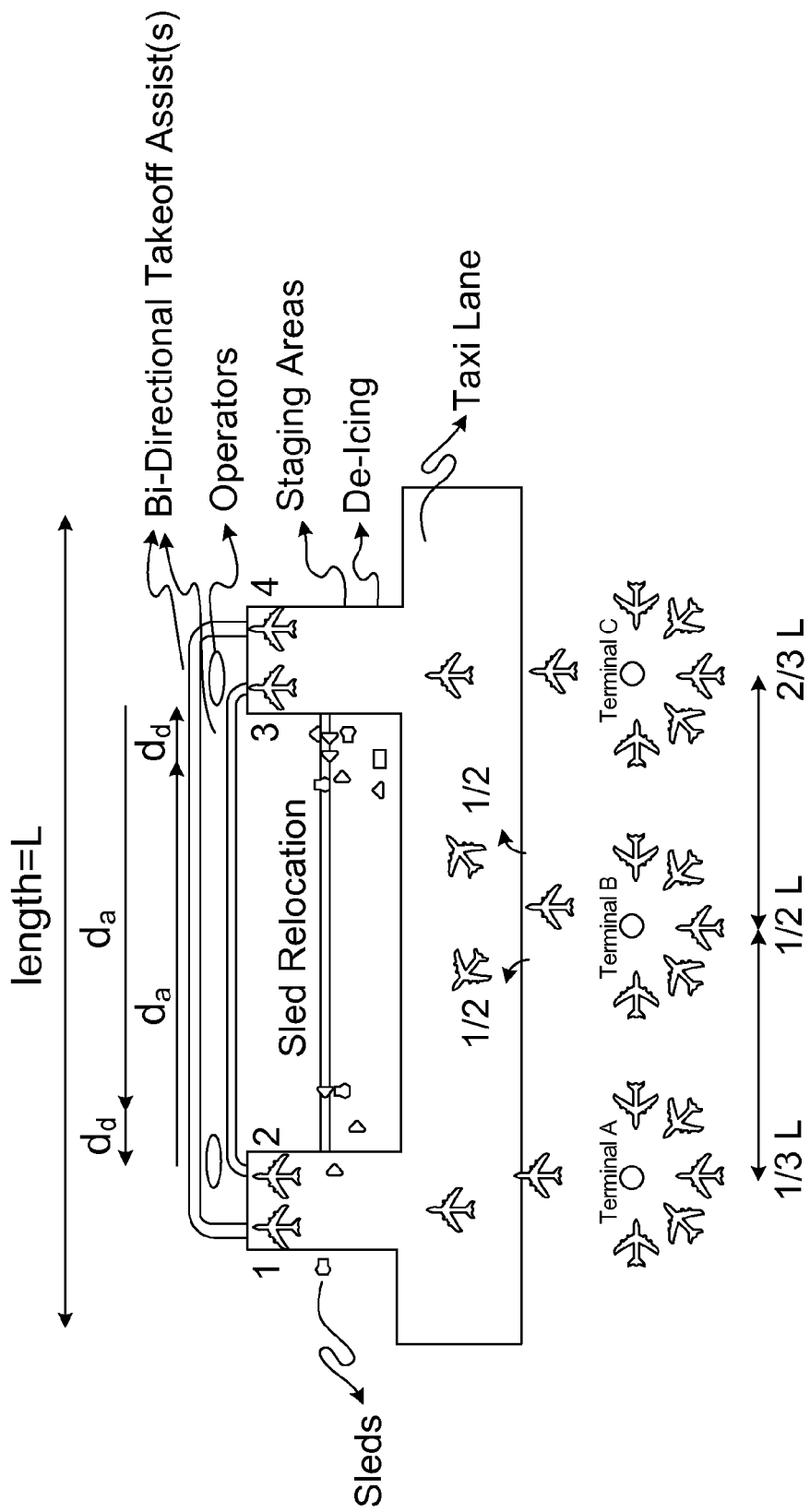
FIG. 12 is a an overhead view of a bi-directional topology aircraft thrust system in accordance with one or more embodiments of the present invention.

FIG. 12 is an overhead view of a bi-directional topology aircraft thrust system in accordance with one or more embodiments of the present invention. Shorter, faster, and higher velocity takeoffs provided by the aircraft thrust system assembly would allow operators to resume nighttime operations by greatly reducing takeoff noise. Pilots could engage at full throttle near takeoff and climb faster and sooner than without takeoff assist, or increase thrust with altitude to maintain constant climb and minimum ground noise. The following chart shows an estimate of the time to climb out from the bi-directional topology system.

| Item | | |
|---|---|---|
| L ≈ | 1.6 km (1.25 mi) | 1.6 km |
| semi-independent simultaneous takeoffs | 2 | topology |
| time to climb out ≈ | 210 s | 30 km/0.208 km/s + turnaround |

Figure 13:
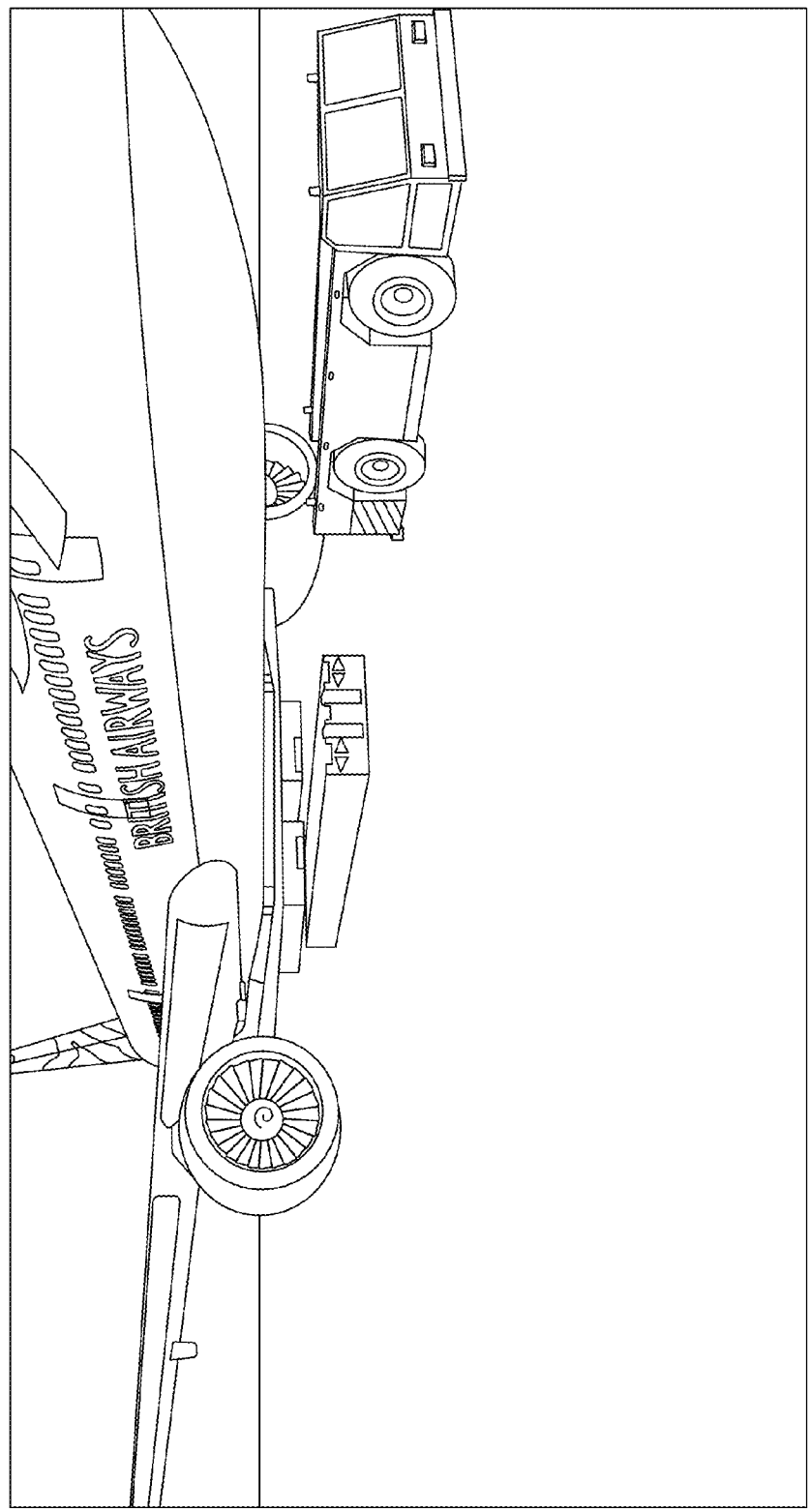
FIG. 13 is a perspective view of a staging area which may be used in various embodiments of the present invention.

FIG. 13 is a perspective view of a staging area which may be used in various embodiments of the present invention. Aircraft ready for takeoff depart the gate and approach a staging area to prepare for takeoff as designated by airport tower control. As the aircraft rolls into the staging area, load cells, supporting electronics, communications and a computer system determine the center of mass of the aircraft. Ground services position a maglev sled under the aircraft with guidance from a computer system. Ground crews notify pilots of measured mass (weight) and location of the center of mass. Pilots set flaps and slats to desired takeoff velocity and notify thrust assembly controllers of desired takeoff velocity. Pilots stow landing gear and the aircraft is moved to one of two thrust systems depending upon the flight path of the aircraft and designations for airspace use. Pilots notify ground thrust assembly controllers when ready for takeoff, and controllers energize the thrust assembly to accelerate the airplane. Once close to takeoff velocity, internal pressure inside the airbags under the aircraft on the sled falls below a threshold that triggers further deflation of the airbags and starts the deceleration process for the sled. Sleds decelerate and disengage from the thrust assembly and then return to the staging area to service additional flights.

As they have in the past, departing aircraft taxi from the gate where passengers enplane or from freight work zones. However, the staging area for takeoff preparation bisects the maglev rail or thrust assembly. Takeoff from near the center of the airport reduces the distance aircraft need to taxi before entering the staging area for takeoff. Other layouts allow the catapults to operate in two directions with staging areas near terminals on opposite ends of the airport.

Aircraft traveling east will takeoff to the east from the staging area, and aircraft traveling west will takeoff to the west from the staging area. Or, if all aircraft takeoff to the east, then an aircraft can takeoff using one of two thrust assemblies running roughly in parallel to each other. When coordinated across a group of airports who share airspace, controllers can orchestrate takeoffs to minimize the need for pilots to turn around before following their more direct flight path. The ability to launch into tail winds also provides a stable operating environment for takeoffs with faster climb outs and less interference time between departing and arriving aircraft.

Figure 14:
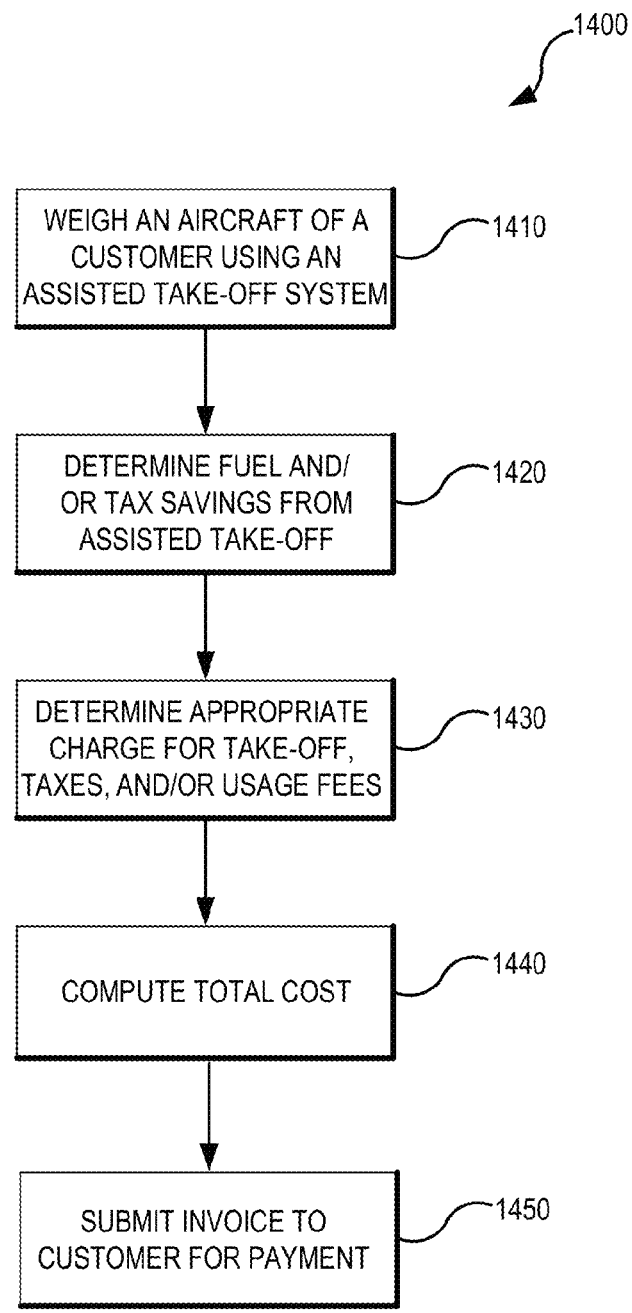
FIG. 14 is a flowchart with a set of operations for assessing charges to a customer for the utilization of an assisted takeoff system according to various embodiments of the present invention.

FIG. 14 is a flowchart with a set of operations for assessing charges to a customer for the utilization of an assisted takeoff system according to various embodiments of the present invention. As illustrated in FIG. 14, weighing operation 1410 weighs the aircraft of a customer that is using an assisted takeoff system. In some embodiments, a sled within the assisted takeoff system can include a scale to determine the takeoff weight of the aircraft. Using this information, savings operation 1420 can determine the fuel and/or tax savings that result from this aircraft using the assisted takeoff system when compared to a traditional non-assisted takeoff. For example, since the aircraft can be accelerated using (completely or in part) the catapult system, there will be a reduction in fuel usage, wear and tear on the engine, and possibly a potential take savings to encourage the use of the catapult system.

In addition to determining the savings that result from using the assisted takeoff systems, charging operation 1430 can determine any charges, taxes, and/or other usage fees that need to be assessed. Computation operation 1440, then computes the total cost or charge which should be billed to the customer based on the savings and fees. For example, various embodiments allow for multiple combinations of the cost savings and fees. For example, some customers may have negotiated paying a higher percentage of the savings amount for a lower fee rate. Similarly, other customers may have negotiated paying a lower percentage of the savings amount for a higher fee amount. Still yet, some customers may pay all of the savings in order to avoid any fees or simply pay higher fees to avoid paying any percentage of the savings. Once the total cost is computed, submission operation 1450 submits an invoice to the customer for payment.

Exemplary Computer System Overview

Figure 15:
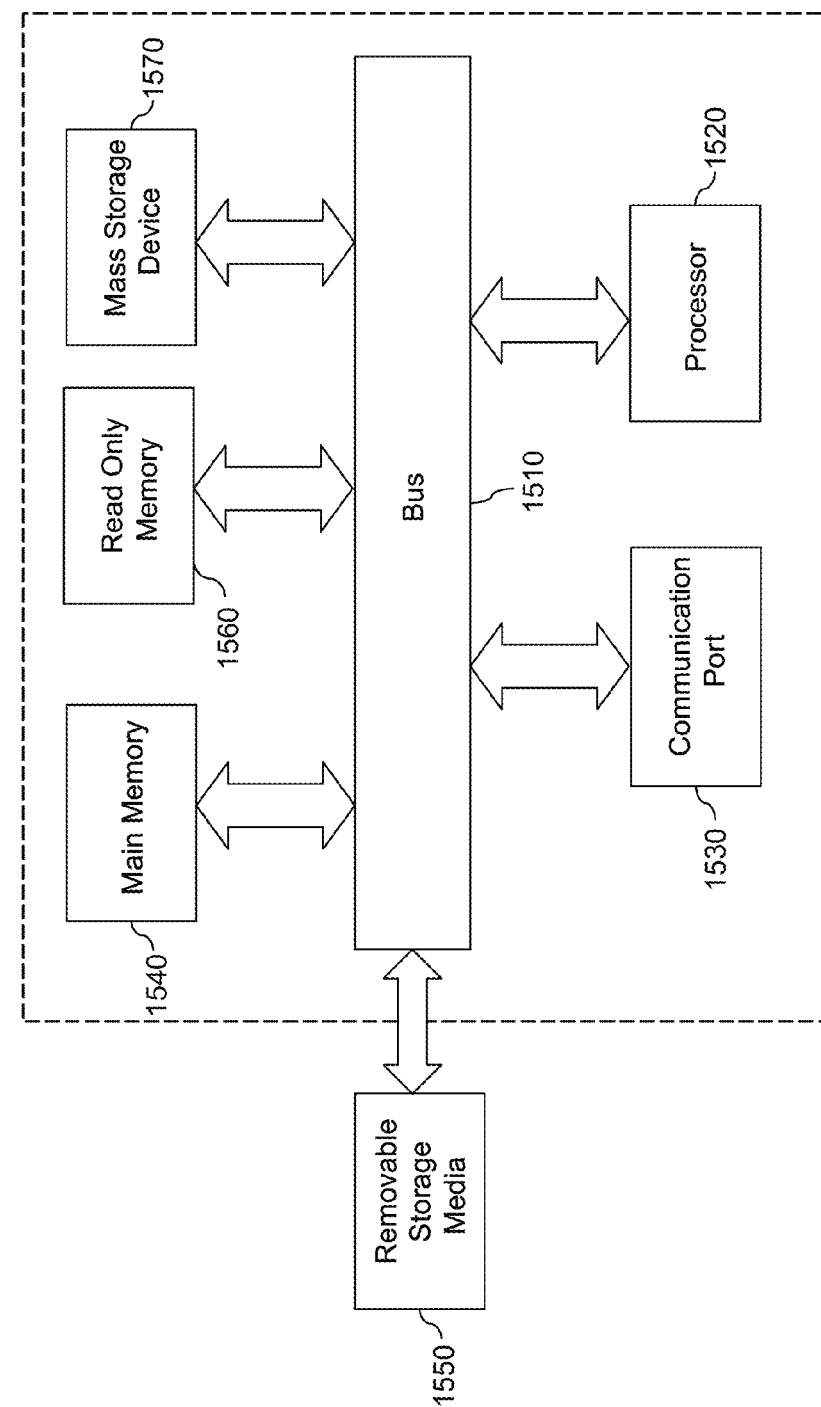
FIG. 15 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 15 is an example of a computer system 1500 with which embodiments of the present invention may be utilized. According to the present example, the computer system includes a bus 1510, at least one processor 1520, at least one communication port 1530, a main memory 1540, a removable storage media 1550, a read only memory 1560, and a mass storage 1570.

Processor(s) 1520 can be any known processor, such as, but not limited to, ARM or x86-type processors, such as an Intel® Itanium® or Itanium 2® processor(s); AMD® Opteron® or Athlon MP® processor(s); or Motorola® lines of processors. Communication port(s) 1530 can be any of an RS-232 port for use with a modem-based dialup connection, a 10/100 Ethernet port, or a Gigabit port using copper or fiber. Communication port(s) 1530 may be chosen depending on a network such as a Local Area Network (LAN), Wide Area Network (WAN), or any network to which the computer system 1500 connects. The communication port 1530 may also encompass wireless communications components, such as an IEEE 802.11, 3G/4G or other wireless transceiver.

Main memory 1540 can be Random Access Memory (RAM) or any other dynamic storage device(s) commonly known in the art. Read only memory 1560 can be any static storage device(s) such as Programmable Read Only Memory (PROM) chips for storing static information such as instructions for processor 1520.

Mass storage device 1570 can be used to store information and instructions. For example, hard disks such as the Adaptec® family of SCSI drives, an optical disc, an array of disks such as RAID, such as the Adaptec family of RAID drives, or any other mass storage devices may be used.

Bus 1510 communicatively couples processor(s) 1520 with the other memory, storage and communication blocks. Bus 1510 can be a PCl/PCI-X or SCSI-based system bus depending on the storage devices used.

Removable storage media 1550 can be any kind of external hard-drives, floppy drives, IOMEGA® Zip Drives, Compact Disc-Read Only Memory (CD-ROM), Compact Disc-Re-Writable (CD-RW), and/or Digital Video Disk-Read Only Memory (DVD-ROM).

The components described above are meant to exemplify some types of possibilities. In no way should the aforementioned examples limit the scope of the invention, as they are only exemplary embodiments.

In conclusion, the present invention provides novel systems, methods, and arrangements for aircraft thrust systems. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations that fall within the scope of the claims, together with all equivalents thereof. Therefore, the above description should not be taken as limiting the scope of the invention, which is defined by the appended claims.

What is claimed is:

1. A takeoff control system comprising:
    a sled adapted to support an aircraft resting on the sled, wherein the sled is adapted to prevent, via adhesion to at least wings and a fuselage of the aircraft, the aircraft from sliding, wherein a portion of the sled conforms to the wings and fuselage and is adapted with a coating to reduce sliding of the aircraft during acceleration;
    a guideway configured to receive the sled and move the sled along the guideway for assisted takeoff of the aircraft; and
    a magnetic propulsion system configured to levitate the sled and propel the sled along the guideway independent of thrust provided by the aircraft.

2. The system of claim 1, wherein the magnetic propulsion system decreases magnetic levitation forces based on a position of the aircraft along the guideway.

3. The system of claim 1, wherein the guideway includes a launch path on which the airplane is accelerated by the magnetic propulsion system for takeoff.

4. The system of claim 1, wherein the sled is adapted to redirect airflow during acceleration to increase the adhesion between the sled and the fuselege.

5. The system of claim 1, wherein the guideway includes a bi-directional topology, wherein the guideway includes a launch path and a return path in opposite directions.

6. The system of claim 1, wherein the guideway includes a perpendicular topology, wherein the guideway includes a launch path perpendicular to a return path.

7. A method comprising:
    transferring an aircraft to a sled coupled to a guideway configured to accelerate the sled using ground-based energy, wherein transferring the aircraft includes positioning the sled underneath a center of gravity of the aircraft to support wings and a fuselage of the aircraft;
    expanding, after said transferring, an inflatable structure of the sled in size up to a side of the fuselege to grip the aircraft and prevent the aircraft, while the sled is accelerating, from sliding and rotating about the center of mass of the aircraft; and
    accelerating the sled along the guideway utilizing the ground-based energy to increase airflow velocity over the wings to lift the aircraft for takeoff from the guideway.

8. The method of claim 7, further comprising using a set of sensors to measure a weight of the aircraft, a current air temperature, a distance to an end of the guideway, a pressure the aircraft is placing on the sled, or any combination thereof.

9. The method of claim 7, further comprising magnetically levitating the sled above the guideway.

10. The method of claim 9, wherein said accelerating the sled is via magnetic propulsion.

11. The method of claim 7, further comprising activating an engine of the aircraft at full throttle during the takeoff.

12. The method of claim 7, further comprising maintaining an engine of the aircraft below full throttle during the takeoff and increasing thrust of an engine of the aircraft, after the takeoff, proportional with altitude of the aircraft to maintain constant climb and minimum ground noise.

\* \* \* \* \*